United States Patent [19]
Conklin, Jr.

[11] Patent Number: 5,165,526
[45] Date of Patent: Nov. 24, 1992

[54] CONVEYOR SYSTEM WITH PANELS CONTAINING VISUAL INFORMATION

[76] Inventor: Dennis R. Conklin, Jr., 2700 N. Hayden, Apt. 1108, Scottsdale, Ariz. 85257

[21] Appl. No.: 807,186

[22] Filed: Dec. 16, 1991

[51] Int. Cl.⁵ .............................. B65G 17/00
[52] U.S. Cl. ............................ 198/804; 198/850; 40/472; 40/524
[58] Field of Search .......... 40/472, 476, 518, 524–528; 198/831, 850, 851, 852, 853, 804, 577, 502.1

[56] References Cited
U.S. PATENT DOCUMENTS 3,612,244 10/1971 Raub, Sr. et al. ............... 40/476 X
3,849,918 11/1974 Mazzocco, Sr. ................... 40/472
3,982,625 9/1976 Wentz et al. .................. 198/577 X
4,979,591 12/1990 Habegger et al. ............ 198/502.1 X Primary Examiner—D. Glenn Dayoan
Attorney, Agent, or Firm—Don J. Flickinger; Jordan M. Meschkow; Robert A. Parsons

[57] ABSTRACT

A conveyor, such as a baggage carousel, includes a plurality of transparent panels, each having a thin layer containing visual information affixed to its bottom surface. A series of adjacent panels can produce one complete visual unit such as an advertisement. The transparent panels are shaped to match the configuration of the original metal panels designed for each conveyor.

17 Claims, 2 Drawing Sheets

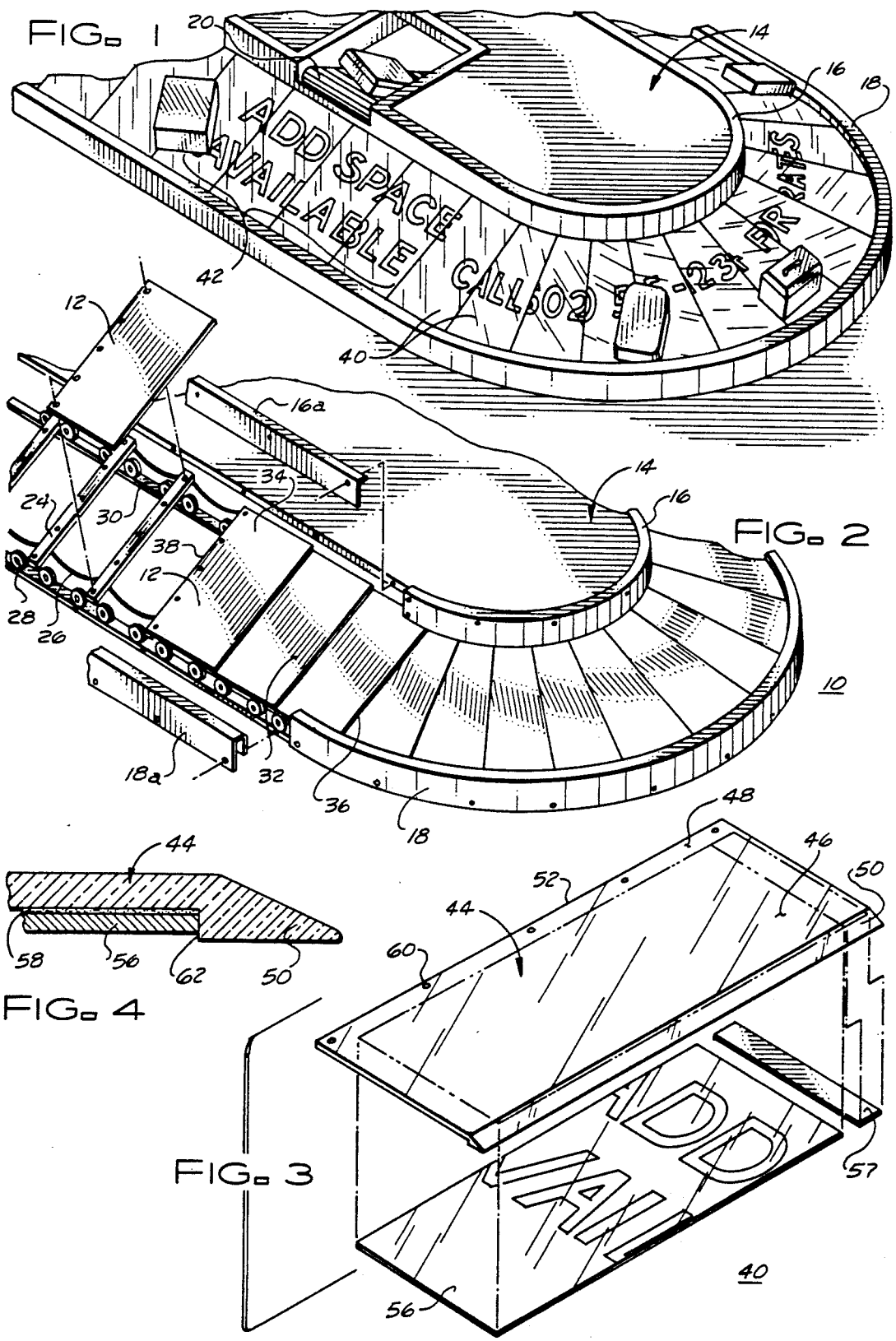

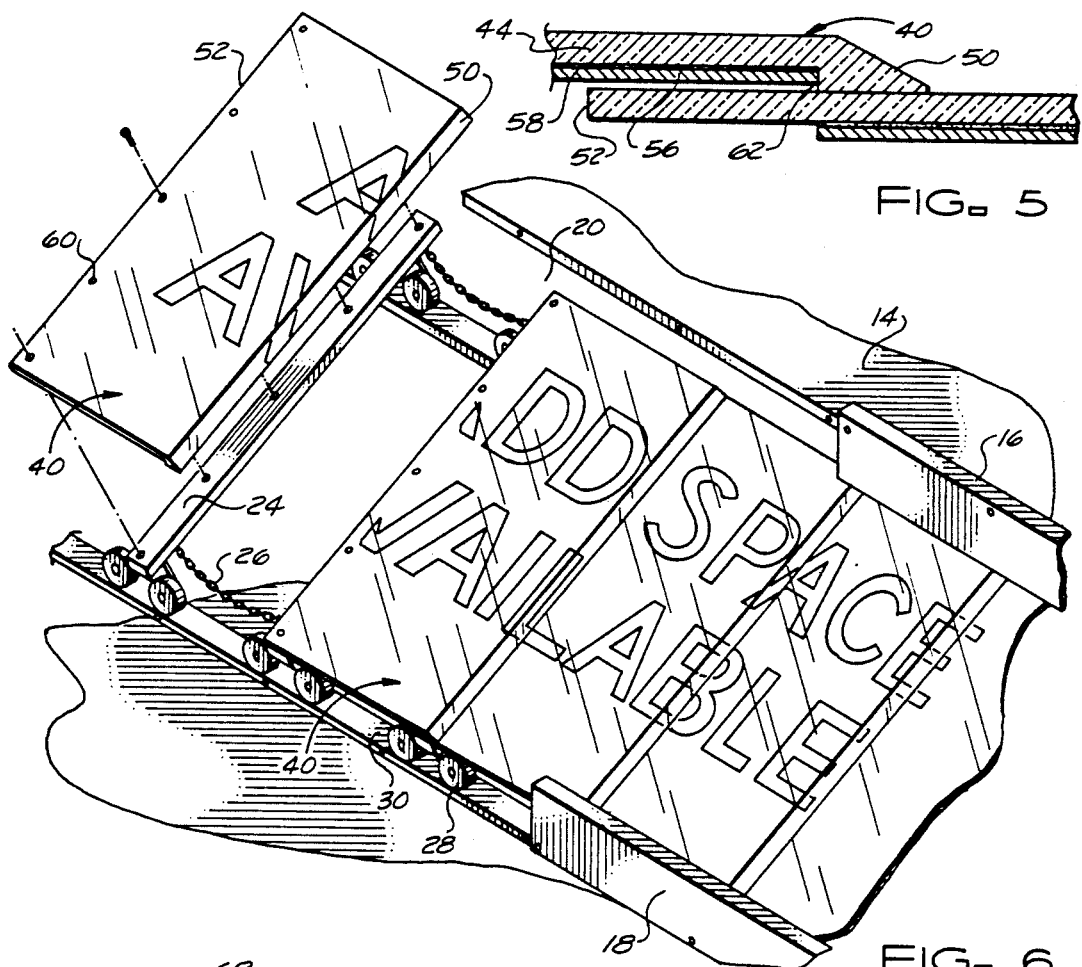
FIG. 5
FIG. 6
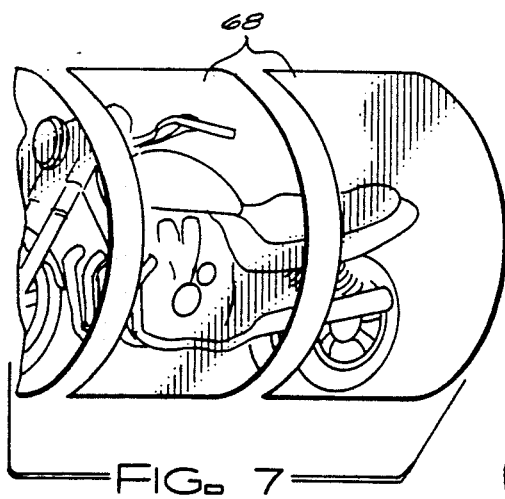
FIG. 7
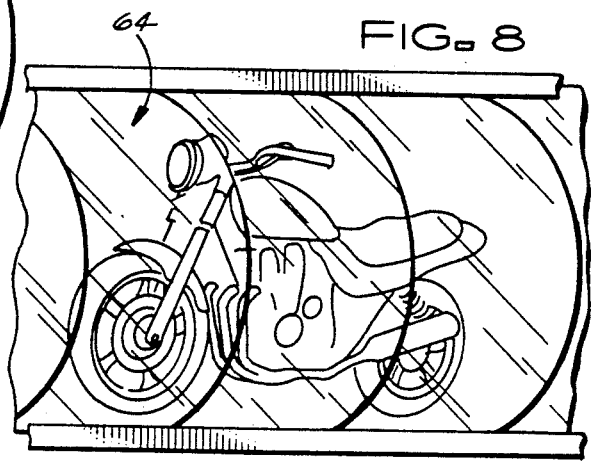
FIG. 8

CONVEYOR SYSTEM WITH PANELS CONTAINING VISUAL INFORMATION

BACKGROUND OF THE INVENTION

1. Field of the Invention

This invention relates to methods and devices for advertising. More particularly, the present invention relates to visual information such as advertising on endless conveyors.

In a further and more specific aspect, the instant invention relates to panels having visual information forming the load carrying platforms on baggage carousels.

2. Prior Art

Conveyors for carrying items from one location to another location are well-known in the art. Conveyors are often placed into an endless essentially circular position for dispensing baggage at an airport for instance. These endless conveyors are often called carousels because the baggage is placed onto the platform sections of the conveyor from a centrally located distributing point and the baggage is available to the passengers around either a circular or an oval pickup area. Especially in the baggage dispensing conveyors and especially in carousels in general, the platform that carries the baggage around the carousel includes a plurality of panels that are generally rectangular and overlay or abut their preceding panels to cover the circular area, especially around the ends of the oval section.

Advertisements are often placed on the center non-moving section of the carousel to display the benefits of staying in the local area around the airport or to advertise the different airlines. The advertising area is extremely limited since the people to whom the advertising is directed generally locate into one specific position around the carousel to retrieve their baggage and thereby only see a small section of the total advertising that could be placed on the non-rotating section of the carousel.

It would be highly advantageous, therefore, to remedy the foregoing and other deficiencies inherent in the prior art.

Accordingly, it is an object of the present invention to provide a conveyor having an improved means for displaying visual information.

Another object of the present invention is to provide a new and improved method for installing visual information on a conveyor.

Another object of the present invention is to provide an advertising device for use with baggage carousels that is relatively inexpensive, and easily installed.

And another object of the present invention is to provide an advertising device which is highly visible and durable.

Still another object of the present invention is to provide a new and improved method for making and using an advertising device for use on conveyor systems, which is relatively inexpensive, and produces highly visible and durable advertising devices.

Yet another object of the present invention is to provide advertising devices which can be used with conveyors, a plurality of which may be used on each conveyor, and which can be individually replaced or changed, to change the visual information.

The Applicant has filed a co-pending application entitled CONVEYOR WITH PLATFORM CONTAINING INDICIA, Ser. No. PCT/US91/05602. The device in the co-pending application is a conveyor having a plurality of panels. Visual information is printed on a sheet of thin, slippery material, which is then attached to the top surface of the panels on the conveyors.

SUMMARY OF THE INVENTION

Briefly, to achieve the desired objects of the invention in accordance with the preferred embodiment thereof, provided is a conveyor, which can be a circular or oval shaped baggage carousel, including panels which carry items on the conveyor, a means to support the panels and a means to transport the panels in sequence, one after the other, from first to last and again repeating with the first panel. The panels are attached to the support means in a overlapping configuration which leaves a viewable section of each panel. The improvement consists of using a transparent material for the panels, and affixing visual information to the underside of each panel. The visual information may be fastened in segments to adjacent panels.

A method for depicting visual information on a conveyor or a carousel which includes a plurality of panels forming the support for the items carried by the conveyor includes the steps of providing panels of transparent material shaped to fit the conveyor or carousel being used, providing a thin layer containing the visual information, cutting or otherwise separating the thin layer into strips which are approximately the width of the viewable section of each panel, fastening each strip of thin layer to the underside of a panel. Existing panels on the conveyor are then removed, and are replaced by panels bearing the desired visual information. When several adjacent panels are attached, a complete visual unit is composed.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 1 is a partial perspective view of a baggage carousel improved in accordance with the teachings of the instant invention;

FIG. 2 is a partial perspective view of a baggage carousel with a portion exploded to illustrate the attachment of panels, and the understructure;

FIG. 3 is an exploded view in perspective, showing an improved panel;

FIG. 4 is a partial cross-sectional view showing the leading edge of one embodiment of an improved panel;

FIG. 5 is a partial cross-sectional view illustrating the overlapping relationship of two adjacent panels;

FIG. 6 is a partial perspective view of a carousel device with the addition of numerous improved panels forming a visual unit;

FIG. 7 shows a section of improved panels of a carousel as prepared in the second method, with the partitioned visual information attached;

FIG. 8 shows the section of panels illustrated in FIG. 7 after they have been installed on a conveyor to form a visual unit.

DESCRIPTION OF THE PREFERRED EMBODIMENT

Turning now to the drawings in which like reference characters indicate corresponding elements throughout the several views, attention is first directed to FIG. 2 which illustrates a baggage carousel generally designated 10. While the present invention may be used with endless conveyors in general, it is especially useful for improving baggage carousels well-known in airports. Baggage carousel 10 includes a plurality of panels 12 that move around the periphery of carousel 10 to carry the baggage around the carousel to the people standing and waiting to receive their baggage. Panels 12 are upstanding between an elevated platform 14 with an upper rail 16 around its periphery and a lower rail 18 around the periphery of the entire carousel. A section is cut out of elevated platform 14 for baggage loading means such as a belt conveyor 20. This is not illustrated in FIG. 2, but can be seen in FIG. 1. Belt conveyor 20 carries the baggage from a baggage loading area which is generally placed at a lower level. Belt conveyor 20 carries the baggage up to the height of elevated platform 14 to slide the baggage onto panels 12. Since panels 12 are at an inclined angle, the baggage will slide down panels 12 from the level of upper rail 16 down to the level of lower rail 18. Panels 12 are generally essentially rectangular shaped.

FIG. 2 further illustrates an exploded section of carousel 10 to show individual panels 12 and a section of the transport means that causes panels 12 to be transported around the circumference of carousel 10. An upper rail section 16A is shown removed from the remaining portion of upper rail 16. Likewise, a lower rail section 18A is removed from the remaining section of lower rail 18 located around the periphery of carousel 10. This then permits panels 12 to be removed from the transport system itself. Panels 12 are fastened by screws, for instance, to a plurality of spaced-apart support bars 24. Each support bar 24 is interconnected by a plurality of chains 26 with adjacent support bars 24 forming a continuous circuit. Each support bar 24 has, preferably, two rollers 28 fastened at each end for moving along a track 30 on which rollers 28, support bars 24, and therefore panels 12 are supported. Generally, an electric motor drive (not shown) causes support bars 24 to move around the periphery of carousel 10. The interconnecting chains 26 pull support bars 24 along track 30. A series of panels 12 can be easily removed from their associated support bars 24 by removing the screws holding each panel 12 to its support bar 24.

Still referring to FIG. 2, each panel 12 is generally formed from a metal such as stainless steel, and includes a viewable section 32 and an overlapping section 34. With this specific carousel design, panels 12 have a leading edge 36 which overlap a trailing edge 38 of the adjacent panel. In this specific carousel 10, trailing edge 38 contains screw holes through which screws are inserted and coupled to support bars 24. Those skilled in the art will understand that while baggage carousel 10, generally oval in shape and having rectangular panels 12 is illustrated, there are many other conveyor and baggage carousel designs upon which the present invention may be used. Generally, these differences consist of differing panel shapes and designs, carousel shape differences, or differing support bars. It will be understood that the present invention may be used with any conveyor which uses removable panels.

Referring to FIG. 1, as illustrated in FIG. 2, and discussed above, carousel 10 is shown with improved panels 40 of the present invention, replacing conventional panels 12. The visual information carried by each improved panel 40 may be a complete ad, or other visual imaging, but in the preferred embodiment is a segment of a visual unit 42. A series of panels containing visual information form a complete visual unit. This visual unit may be an advertisement, information or other visual imagery. The modifications to carousel 10 and the production of improved panels 40 will be discussed in detail below.

Referring to FIG. 3, an exploded view of an improved panel 40 is shown. Improved panel 40 consists of a plate 44, which in this embodiment is rectangular and formed from a strong resilient and transparent material, and visual information affixed thereto. In this embodiment, a polycarbonate, which is transparent, scratch-resistant, has low friction, is rigid, and is formable, is used to form plates 44. However, it will be understood by those skilled in the art that any material having the necessary characteristics may be used. The shape of plate 44 is determined by the type of carousel, such as carousel 10 upon which it is to be used. Plate 44 is shaped so it is identical to panels 12 of carousel 10. In this embodiment, plate 44 is rectangular to match panels 12 and includes a viewable section 46 and an overlapped section 48. With this specific carousel design, plates 44 of improved panels 40 have a leading edge 50 which overlap a trailing edge 52 and overlapped section 48 of an adjacent plate 44. However, other conveyor systems have different shaped panels such as the crescent shape illustrated in FIG. 8. It will be understood that plate 44 may be shaped to match the panels of any conveyor system. Panels 12 of carousel 10 may also have slight bends in them to relieve the stress placed on them as they move around the corners of the carousel. It will also be understood that plate 44 may include any of these stress-relieving bends. The stress-relieving bends on conventional panels may be located at different places on the panels, depending on the manufacturer. Plates 44 can be shaped with any of the many different bends.

To form a visual unit 42 consisting of several improved panels 40, a number of plates 44 are formed having the appropriate shape. A thin layer is provided, upon which the visual information is printed. There are a variety of methods of printing which may be used, but the preferred method, and the method used here, is by silk screen. In the preferred embodiment, the thin layer may be vinyl, polyester, or any similar material. The thin layer is then cut into a number of strips 56. While the thin layer is divided into strips 56, with each strip 56 containing a segment of the complete visual unit 42, those skilled in the art will understand that a thin layer may be provided in a size sufficient for one panel 40. In this case, a complete visual unit would be printed on the thin layer, and then affixed to a single plate 44. This is not illustrated, however, because a series of panels 40 forming a visual unit 42 is preferred. Each strip 56 is affixed to the underside of a plate 44 with an adhesive 58 forming improved panel 40. Adhesive 58 is applied to the face of each strip 56, which is then placed in contact with the underside of plate 44 so that visual information can be seen when looking through the top surface of plate 44. It will be understood by those skilled in the art that adhesive 58 may be any adhesive which will securely fasten polyester, vinyl or like material to a polycarbonate.

Each strip 56 is of substantially the same width, generally identical to the width of viewable section 46, or section of improved panel 40 which is not overlapped by the adjacent improved panel 40. In this embodiment, strip 56 is affixed to plate 44, starting slightly back from leading edge 50 to prevent materials such as dirt, dust or other particles, which may infiltrate between improved panels 40, from damaging or removing strips 56. Each strip 56 is affixed to a plate 44 substantially the same distance from leading edge 50, to aid in aligning the entire visual unit 42. Since strips 56 are of generally the same width, and extend back towards the trailing edge substantially the same distance, when improved panels 40 are attached to support bars 24, as illustrated in FIG. 6, strips 56 align to form a complete visual unit 42.

Referring to FIG. 6, once strips 56 are affixed to plates 44 forming improved panels 40, screw holes 60 are formed in trailing edge 52 of improved panels 40. It will be understood by those skilled in the art, that other panel configurations for use on different conveyor designs will have variously located screw holes for attachment, or even different attachment means entirely. The present invention may be attached to a conveyor, using whatever attachment means that was originally used. The original panels 12 on carousel 10 are removed, and replaced with improved panels 40. A number of adjacent improved panels 40 containing strips 56 combine to form a visual unit 42. A number of visual units 42 can be supported by a carousel 10 as illustrated in FIG. 1.

Referring to FIG. 4, the leading edge 50 of improved panel 40 is shown. In this embodiment, leading edge 50 is beveled to remove stress on improved panel 40 when improved panel 40 is traveling around the bends in carousel 10. The very tip of the beveled area is rounded to remove any sharp edges which would be present if it was squared rather than round. This rounding prevents scratches on the adjacent improved panel 40 which it overlaps. It will be understood by those skilled in the art that while a bevel is shown here to relieve stress around the corners, improved panels 40 may not be beveled, with the stress on the panels at the corners being relieved by other means. When no bevel is used, the entire leading edge would be rounded off to remove edges. If it is not beveled, improved panel 40 may have other features which relieve stress and which were discussed earlier. Conventional panels 12 were often bent near leading edge 36, or back a distance from leading edge 36 to relieve stress. Improved panel 40 may employ identical bends, matching the original panels or panel designs that were used or designed to be used on the conveyor. Improved panels 40 may also have bends in any of the other locations used to relieve stress. The bevel may even be used to relieve stress in combination with other stress-relieving means.

Still referring to FIG. 4, plate 44 may have an inset 62, starting proximate leading edge 50 and running back to trailing edge 52. Inset 62 would allow for exact placement of strips 56 on plate 44 for alignment purposes. Inset 62 would also provide protection to strips 56, preventing them from being scratched by panels it overlaps, as illustrated in FIG. 5. FIG. 5 illustrates the overlapping of two improved panels 40 on a straight stretch of carousel 10. In this case, strips 56 of material are closely aligned so that it appears, when viewed from above, that a continuous visual unit 42 is present. However, when progressing through the corners of the machine, panels 40 will overlap to a greater degree near the top, slightly distorting visual unit 42 as illustrated in FIG. 1. With inset 62, this overlapping and sliding movement between panels will not damage strips 56 of the thin layer. However, it will also be understood that while an inset 62 is illustrated in the preferred embodiment, improved panel 40 without inset 62 Would be effective. The panel illustrated in FIG. 4 would be produced by injection molding, with inset 62 present for aligning strips 56 and offering greater scratch protection. A panel may be produced without inset 62 simply by cutting the desired shape panel from a sheet of polycarbonate or other material used. In this case, visual unit 42 would be aligned by using identical width strips 56, and attaching them a uniform distance from leading edge 50 as discussed earlier. While there is no inset 62 to give additional scratch protection, strips 56 are sufficiently durable to wear well, since the underlying panels are relatively smooth. For asthetic purposes, additional strips of thin border material may be attached to plates 44 above and below strips 56, to border and highlight visual unit 42. The border material above strips 56 may be affixed to the upper surface of plate 44, causing each overlapping panel to be slightly raised near the top of conveyor 10. This will relieve some stress when traversing the corners, and reduce the contact between panels 40. When the border is used in this way, a piece of acetal homopolymer or like material is used. Once a set of improved panels 40 has been produced, they are installed on carousel 10 by removing conventional panels 12 or removing improved panels 40 having visual information which is to be replaced. The new set of improved panels 40 is attached by bolts to support bars 24 in sequence, forming a complete visual unit 42. The visual units are easily replaced by removing improved panels 40, and replacing them with newly prepared panels produced as discussed above.

FIG. 8 illustrates crescent shaped improved panels 64, to illustrate the use of the present invention on various carousels having different panel configurations. A baggage carousel plate similar to plates 44 is constructed of transparent material such as polycarbonate or similar material. The plate dimensions and design again, may vary depending on the baggage carousel used. Here, a crescent shape is illustrated, and is adaptable to all crescent panel type carousels. A visual unit, such as an ad, is printed on a thin layer of vinyl or similar material. An adhesive is placed on the face of the ad. The ad is then cut into strips 68 to match the configuration of a crescent shaped plate. Strips 68 are then attached to the bottom surface of the crescent carousel plate so that the face of the thin layer is attached to the bottom of the plate. Several plates may be used to form an entire ad as illustrated in FIGS. 7 and 8. Existing crescent shaped panels (not shown) are removed from the carousel. Improved crescent panels 64 containing the visual information are attached to the carousel in the same manner as the previous panels. When several improved panels 64 are attached, a complete visual unit is composed as illustrated in FIG. 8.

While lighting in most airports is sufficient to view panels 40 on baggage carousels, enhancing visibility would always be desirable. The addition of back lighting would serve this purpose. The transparency of the plates allows light to be transmitted through an edge, illuminating the entire panel. The result would be an increased intensity to the colors in the visual units, illuminating them for enhanced visibility. This could be accomplished by placing a plurality of light sources as shown by arrow 70 in FIG. 6, around carousel 10, near the underside of improved panels 40, adjacent to their lower or upper edges.

Various changes and modifications to the embodiment herein chosen for purposes of illustration will readily occur to those skilled in the art. For example, while the thin sheet upon which the visual information is printed was described as being vinyl or polyester material, it will be understood that the thin layer which contains the visual information, may be composed solely of ink. In this case, the ink may be hot stamped directly into the back surface of plates 44. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A conveyor comprising:
   a plurality of transparent panels, each containing visual information;
   a plurality of support bars, at least one of which corresponds to each of said plurality of transparent panels;
   means for supporting said support bars in a spaced-apart relationship, forming a continuous circuit;
   means for removably fastening each of said plurality of transparent panels to said support bars consecutively so that each transparent panel has a viewable portion substantially contiguous with the viewable portion of adjacent transparent panels; and
   means for transporting said support bars with corresponding transparent panels along said support means.

2. A conveyor as claimed in claim 1 wherein each of said transparent panels further comprises:
   a plate shaped to engage said support bars, and having a top surface and a bottom surface; and
   a thin layer containing visual information affixed to said bottom surface of said plate.

3. A conveyor as claimed in claim 2 wherein said thin layer is a material with visual information printed thereon affixed to said bottom surface of said viewable portion of said plate with an adhesive.

4. A conveyor as claimed in claim 2 wherein said thin layer is a medium forming said visual information, affixed to said viewable portion of said plate by hot stamping.

5. A conveyor as claimed in claim 2 wherein said fastening means comprises:
   screw holes formed in each of said transparent panels corresponding to screw holes in each of said support bars; and
   screws inserted in said screw holes fastening said transparent plates to said support bars.

6. A conveyor as claimed in claim 2 wherein a series of thin layers containing visual information are affixed to plates forming panels which are fastened consecutively to said support bars, forming a complete visual unit.

7. A conveyor as claimed in claim 2 wherein said transparent panels are back lit by a light source.

8. A conveyor as claimed in claim 2 wherein said plate is formed from polycarbonite.

9. A baggage carousel comprising:
   a plurality of support bars;
   means for supporting said support bars in a spaced apart relationship and forming a continuous circuit;
   a plurality of item-bearing transparent panels including;
      a plate, shaped to engage said support bars, and having a top surface and a bottom surface, and
      a thin layer containing visual information affixed to said bottom surface of said plate,
   means for removably fastening each of said plurality of transparent panels to said support bars consecutively so that each transparent panel has a viewable portion substantially contiguous with the viewable portion of adjacent transparent panels; and
   means for transporting said support bars with corresponding transparent panels along said support means.

10. A baggage carousel as claimed in claim 9 wherein each of said panels partially overlaps an adjacent panel so that each panel has an overlapped portion and a viewable portion.

11. A baggage carousel as claimed in claim 10 wherein said thin layer is a material with visual information printed thereon affixed to said bottom surface of said viewable portion of said plate with an adhesive.

12. A baggage carousel as claimed in claim 9 wherein each of said panels has a leading edge and a trailing edge, said leading edge of each panel abutting said trailing edge of adjacent panels.

13. A method for depicting visual information on a conveyor comprising the steps of:
   providing transparent panels containing visual information; and
   installing said transparent panels on a compatible conveyor consecutively so that each transparent panel has a viewable portion substantially contiguous with the viewable portion of adjacent transparent panels.

14. A method as claimed in claim 13 wherein the step of providing transparent panels containing visual information further comprises the steps of:
   providing at least one thin layer containing visual information;
   providing transparent plates having an upper surface, a lower surface, and configured to be attachable to said conveyor;
   dividing said thin layer into strips of substantially the same width as the viewable portion of each plate, each strip containing visual information;
   affixing a strip of said thin layer to said viewable portion of said lower surface of each transparent plate to form a transparent panel containing visual information.

15. A method as claimed in claim 14 wherein the step of providing a thin layer further comprises the steps of:
   providing a thin layer; and
   printing visual information on a surface of said thin layer.

16. A method as claimed in claim 15 wherein the step of affixing a strip of thin layer further comprises the steps of:
   applying an adhesive to said printed surface of said strips; and
   placing said adhesive coated surface of said strips against said viewable portion of said lower surfaces of each transparent plate.

17. A method as claimed in claim 13 wherein the step of providing transparent panels containing visual information further comprises the steps of:
   providing transparent plates having an upper surface, a lower surface, and configured to be attachable to said conveyor; and
   hot stamping visual information onto said lower surface of said transparent plate.

* * * * *